(12) United States Patent
Liao et al.

(10) Patent No.: US 10,621,339 B2
(45) Date of Patent: Apr. 14, 2020

(54) MONITOR APPARATUS, METHOD, AND NON-TRANSITORY COMPUTER READABLE STORAGE MEDIUM THEREOF

(71) Applicant: Institute For Information Industry, Taipei (TW)

(72) Inventors: Jian-Wei Liao, Taipei (TW); Chin-Wei Tien, Taipei (TW); Chia-Kang Ho, Hsinchu County (TW)

(73) Assignee: Institute For Information Industry, Taipei (TW)

( * ) Notice: Subject to any disclaimer, the term of this patent is extended or adjusted under 35 U.S.C. 154(b) by 206 days.

(21) Appl. No.: 15/839,378

(22) Filed: Dec. 12, 2017

(65) Prior Publication Data

US 2019/0156026 A1    May 23, 2019

(30) Foreign Application Priority Data

Nov. 23, 2017    (TW) .............................. 106140754 A (51) Int. Cl.
*G06F 21/55* (2013.01)
*H04L 9/32* (2006.01)
(Continued)

(52) U.S. Cl.
CPC ............ *G06F 21/552* (2013.01); *G06F 17/18* (2013.01); *G06F 21/52* (2013.01); *G06F 21/554* (2013.01);
(Continued)

(58) Field of Classification Search
CPC .................................................... G06F 21/552
(Continued)

(56) References Cited

U.S. PATENT DOCUMENTS 7,386,751 B2    6/2008 Cheng et al.
8,868,461 B2    10/2014 Rotella et al.
(Continued)

FOREIGN PATENT DOCUMENTS

CN    106506203 A    3/2017
TW    573266 B    1/2004
(Continued)

OTHER PUBLICATIONS

The extended European Search Report rendered by the European Patent Office for European Patent Application No. 18150752.6, dated Jun. 4, 2018, 9 pages.
(Continued)

*Primary Examiner* — Peter C Shaw
(74) *Attorney, Agent, or Firm* — Skaar Ulbrich Macari, P.A.

(57) ABSTRACT

A monitor apparatus, method, and non-transitory computer readable storage medium thereof are provided. The monitor method is adapted for an electronic computing apparatus, wherein the electronic computing apparatus stores a smart contract and a blockchain ledger of a blockchain system. The monitor method periodically executes the following steps: (a) obtaining a piece of behavior information of a first electronic apparatus at a time point, (b) retrieving, via the smart contract, a plurality of pieces of previous behavior information within a time interval from the blockchain ledger, wherein the time interval is defined by the time point, and each piece of previous behavior information corresponds to one of a plurality of second electronic apparatuses and the first electronic apparatus, (c) determining a legality of the piece of behavior information according to the pieces of previous behavior information, and (d) writing the behavior information into the blockchain ledger.

15 Claims, 7 Drawing Sheets

(51) Int. Cl.

| | |
|---|---|
| *G06F 21/52* | (2013.01) |
| *G06F 21/60* | (2013.01) |
| *G06F 17/18* | (2006.01) |
| *H04L 29/06* | (2006.01) |
| H04L 9/06 | (2006.01) |
| G06F 16/27 | (2019.01) |
| G06F 21/12 | (2013.01) |
| G06F 21/56 | (2013.01) |

(52) U.S. Cl.
CPC .......... *G06F 21/604* (2013.01); *H04L 9/3239* (2013.01); *H04L 9/3297* (2013.01); *H04L 63/1416* (2013.01); *G06F 16/27* (2019.01); *G06F 21/123* (2013.01); *G06F 21/556* (2013.01); *G06F 21/567* (2013.01); *G06F 2221/0746* (2013.01); *H04L 9/0637* (2013.01); *H04L 63/1425* (2013.01); *H04L 63/1441* (2013.01); *H04L 2209/38* (2013.01); *H04L 2463/141* (2013.01); *H04L 2463/142* (2013.01)

(58) Field of Classification Search
USPC .......................................................... 726/28
See application file for complete search history.

(56) References Cited

U.S. PATENT DOCUMENTS

| | | |
|---|---|---|
| 2006/0282893 A1 | 12/2006 | Wu et al. |
| 2012/0005755 A1* | 1/2012 | Kitazawa ................ G06F 21/56 726/24 |
| 2014/0283062 A1 | 9/2014 | Kamthe |
| 2016/0055336 A1 | 2/2016 | Ryu |
| 2017/0257388 A1 | 9/2017 | Addepalli et al. |
| 2018/0181751 A1* | 6/2018 | Jagadeesan ........... G06F 21/552 |
| 2018/0268151 A1* | 9/2018 | Cuomo ................. G06F 21/645 |
| 2018/0287797 A1* | 10/2018 | Banerjee ................... H04L 9/32 |
| 2018/0315145 A1* | 11/2018 | Darnell ................ G06Q 50/205 |
| 2019/0014124 A1* | 1/2019 | Reddy ................... H04L 63/108 |
| 2019/0199531 A1* | 6/2019 | Staples ................. H04L 9/0618 |

FOREIGN PATENT DOCUMENTS

| | | |
|---|---|---|
| TW | I294726 B | 3/2008 |
| TW | 201432597 A | 8/2014 |
| TW | M542178 | 5/2017 |
| TW | M543413 U | 6/2017 |
| TW | 201733303 A | 9/2017 |
| WO | 2017145016 A1 | 8/2017 |

OTHER PUBLICATIONS

Marco Iansiti et al., "The Truth About Blockchain", Harvard Business Review, Jan. 1, 2017, 11 pages.

Konstantinos Christidis, Micheal Devetsikiotis; Blockchains and Smart Contracts for the Internet of Things; IEEE Access; May 10, 2016; 12 pages.

Ali Dorri, Salil S. Kanhere, Raja Jurdak, Praveen Gauravaram; Blockchain for IoT Security and Privacy: The Case Study of a Smart Home; 2nd IEEE PERCOM Workshop on Security Privacy and Trust in the Internet of Things 2017; Mar. 13, 2017, 6 pages.

Office Action to the corresponding Taiwan Patent Application No. 106140754 rendered by the Taiwan Intellectual Property Office (TIPO) dated Nov. 26, 2018, 9 pages (including English translation).

Office Action to the corresponding European Patent Application No. 18 150 752.6 rendered by the European Patent Office (EPO) dated Jun. 27, 2019, 7 pages.

\* cited by examiner

MONITOR APPARATUS, METHOD, AND NON-TRANSITORY COMPUTER READABLE STORAGE MEDIUM THEREOF

PRIORITY

This application claims priority to Taiwan Patent Application No. 106140754 filed on Nov. 23, 2017, which is hereby incorporated by reference in its entirety.

FIELD

The present invention relates to a monitor apparatus, method, and non-transitory computer readable storage medium thereof. More particularly, the present invention relates to a monitor apparatus, method, and non-transitory computer readable storage medium thereof that adopt the blockchain technology.

BACKGROUND

In recent years, the technology of Internet of Things (IoT) has been widely applied in various fields, which means a large number of IoT apparatuses having been deployed in various environments.

Many security problems are associated with the function-oriented IoT apparatuses. A frequently encountered problem is that the recently-discovered and/or undiscovered program security vulnerability of an IoT apparatus cannot be repaired timely and, therefore, the latest attack routes/means of hackers cannot be blocked. For example, a hacker may launch a zero-day attack against the program security vulnerability of an IoT apparatus which is not repaired timely (i.e., zero-day exploit), e.g., launching a Distributed Denial of Service (DDoS) attack against the zero-day exploit. A hacker may intrude in an IoT apparatus via the program security vulnerability that is recently discovered and/or undiscovered, make an illegal application executed on the IoT apparatus, and, thereby, manipulate the IoT apparatus to execute various illegal operations, e.g., control an IP camera to execute a specific function and derive images.

To prevent IoT apparatuses from being attacked by hackers, some conventional technologies deal with the information security issue by filtering activating applications according to a predetermined blacklist. The blacklist may comprise IP addresses (i.e., illegal or suspicious IP addresses) that have to be filtered out or features of program codes of malicious software. Nevertheless, a blacklist cannot be updated timely and, thus, there is still a window that the information security is still vulnerable. Additionally, some conventional technologies deal with the information security issue by adopting a centralized management or single-point defense architecture. However, this practice has the problems that an apparatus being responsible for the management/defense becomes the target of attacks and attack information cannot be shared. As a result, effective security protection cannot be achieved as well. Accordingly, there is still an urgent need for a monitor method that can maintain information security of IoT apparatuses.

SUMMARY

The disclosure includes a monitor apparatus, which comprises a storage unit and a processing unit electrically connected to the storage unit. The storage unit is configured to store a blockchain ledger and a smart contract of a blockchain system. The processing unit is configured to execute a blockchain node program, and the blockchain node program performs the following operations periodically: (a) obtaining a piece of behavior information of a first electronic apparatus at a time point; (b) retrieving, via the smart contract, a plurality of pieces of previous behavior information within a time interval from the blockchain ledger, wherein the time interval is defined by the time point, and each of the pieces of previous behavior information corresponds to one of a plurality of second electronic apparatuses and the first electronic apparatus; (c) determining a legality of the piece of behavior information according to the plurality of pieces of previous behavior information; and (d) writing the piece of behavior information into the blockchain ledger.

The disclosure also includes a monitor method adapted for an electronic computing apparatus. The electronic computing apparatus stores a smart contract and a blockchain ledger of a blockchain system. The monitor method monitors a first electronic apparatus periodically. Specifically, the operation that monitoring the first electronic apparatus periodically comprises the following steps: (a) obtaining a piece of behavior information of the first electronic apparatus at a time point; (b) retrieving, via the smart contract, a plurality of pieces of previous behavior information within a time interval from the blockchain ledger, wherein the time interval is defined by the time point, and each of the pieces of previous behavior information corresponds to one of a plurality of second electronic apparatuses and the first electronic apparatus; (c) determining a legality of the piece of behavior information according to the plurality of pieces of previous behavior information; and (d) writing the piece of behavior information into the blockchain ledger.

The disclosure further includes a non-transitory computer readable storage medium having a computer program stored therein. When the computer program is loaded into an electronic computing apparatus, a plurality of codes comprised in the computer program are executed by the electronic computing apparatus to achieve the aforesaid monitor method.

The monitoring technology (including the monitor apparatus, method, and non-transitory computer readable storage medium thereof) provided herein can periodically determine the legality (i.e., being normal or abnormal) of an operation behavior of an electronic apparatus according to a piece of behavior information of the electronic apparatus. The monitoring technology provided herein can decide a time interval according to a time point of the piece of behavior information, and determine the legality of the operation behavior of the electronic apparatus according to a plurality of pieces of previous behavior information of all electronic apparatuses in the same IoT system within the time interval. Because (a) all the electronic apparatuses comprised in the function-oriented IoT system have, in principle, similar operation behaviors within the same time interval and (b) the plurality of pieces previous behavior information are stored in the blockchain ledger that cannot be tampered easily, the monitoring technology herein can accurately determine whether the electronic apparatus is abnormal through the aforesaid operations. When there is an abnormal behavior, an alert message may be provided to the user to stop the illegal operations on the electronic apparatus as soon as possible. Because all the electronic apparatuses in the IoT system adopt the same monitoring technology and maintain the same blockchain ledger together, regional joint-protection can be achieved. Hence, the monitoring technology herein overcomes the shortcomings of the conventional technologies.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the monitor apparatus, method, and non-transitory computer readable storage medium thereof according to the present invention will be explained with reference to example embodiments thereof. However, these example embodiments are not intended to limit the present invention to any specific examples, embodiments, environment, applications, or particular implementations described in these example embodiments. Therefore, description of these example embodiments is only for purpose of illustration rather than to limit the scope of the present invention.

It should be appreciated that, in the following embodiments and the attached drawings, elements unrelated to the present invention are omitted from depiction; and dimensions of and dimensional relationships among individual elements in the attached drawings are provided only for purpose of illustration but not to limit the scope of the present invention.

Figure 1A:
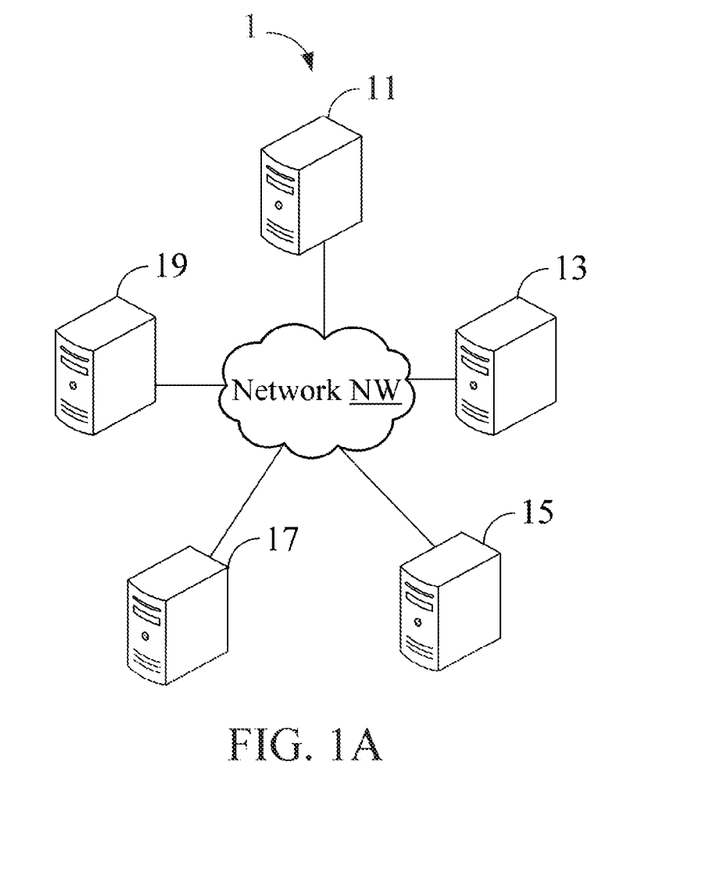
FIG. 1A depicts a schematic architectural view of an IoT system 1 according to a first embodiment.

A first embodiment of the present invention is an IoT system 1, a schematic architectural view of which is depicted in FIG. 1A. The IoT system 1 comprises a plurality of monitor apparatuses 11, 13, 15, 17, and 19, which connect with a network NW. Each of the monitor apparatuses 11, 13, 15, 17, and 19 can execute operations (e.g., sensing nearby information) that can be executed by an IoT apparatus, so each of the monitor apparatuses 11, 13, 15, 17, and 19 may be considered as an IoT apparatus in the IoT system 1. Please note that there is no restriction on the number of monitor apparatuses that can be comprised in the IoT system 1. Please also note that each of the monitor apparatuses 11, 13, 15, 17, and 19 may be any electronic apparatus having a computing capability and a storing capability.

In this embodiment, the monitor apparatuses 11, 13, 15, 17, and 19 adopt the same monitoring technology. For convenience, the following description will focus on the details of the monitoring technology adopted by the monitor apparatus 11. A person of ordinary skill in the art will understand the operations of the monitor apparatuses 13, 15, 17 and 19 based on the following description related to the monitor apparatus 11.

Figure 1B:
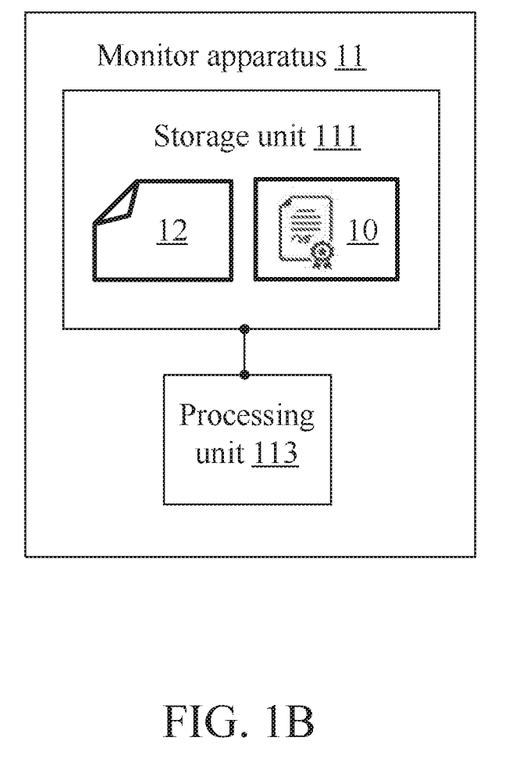
FIG. 1B depicts a schematic architectural view of a monitor apparatus 11 according to the first embodiment.

FIG. 1B depicts a schematic architectural view of the monitor apparatus 11 of this embodiment. The monitor apparatus 11 comprises a storage unit 111 and a processing unit 113 electrically connected to the storage unit 111. The storage unit 111 may be a memory, a Universal Serial Bus (USB) disk, a hard disk, a Compact Disk (CD), a mobile disk, a database, or any other storage medium or circuit having similar functionalities and known to those of ordinary skill in the art. The processing unit 113 may be any of various processors, central processing units (CPUs), microprocessors, or other computing apparatuses that are known to those of ordinary skill in the art.

In this embodiment, the IoT system 1 adopts the blockchain technology. In other words, each of the monitor apparatuses 11, 13, 15, 17, and 19 is a blockchain node and these blockchain nodes form a blockchain system. To have the monitor apparatus 11 become a blockchain node of the blockchain system, the processing unit 113 executes a blockchain node program (not shown) and the storage unit 111 stores a smart contract 10 and a blockchain ledger 12 of the blockchain system. The smart contract 10 may comprise program codes which can verify the legality of data transmission and reception in the blockchain system. For example, the smart contract 10 may be an encrypted contract that is formulated by the administrator of the blockchain system. For the monitor apparatus 11, both receiving data from other monitor apparatuses 13, 15, 17, and 19 in the blockchain system and transmitting data to other monitor apparatuses 13, 15, 17, and 19 in the blockchain system must be verified by the smart contract 10 in advance. A person of ordinary skill in the art has the knowledge of various encryption algorithms or verification technologies that can be adopted by the smart contract 10 and how the smart contract 10 verifies operations performed in the blockchain system, so the details will not be further described herein.

The blockchain ledger 12 is maintained by all blockchain nodes (i.e., the monitor apparatuses 11, 13, 15, 17, and 19) in the blockchain system together. In this embodiment, the blockchain ledger 12 records a plurality of pieces of previous behavior information, and each of the pieces of previous behavior information is detected by one of a plurality of electronic apparatuses (i.e., the monitor apparatuses 11, 13, 15, 17, and 19) at a certain time point. Each of the monitor apparatuses 11, 13, 15, 17, and 19 stores a copy of the same blockchain ledger. Because the pieces of previous behavior information are stored in the blockchain ledger, they cannot be tampered by hackers easily. When any of the monitor apparatuses 11, 13, 15, 17, and 19 generates/detects a new piece of behavior information and adds the new piece of behavior information to its blockchain ledger (i.e., have the new piece of behavior information become one of the pieces of previous behavior information), the monitoring apparatus will transmit this new piece of behavior information to other monitor apparatuses to synchronize the blockchain ledgers (e.g., synchronizing through broadcasting). In other words, this new piece of behavior information will be added to the blockchain ledger stored in each of the monitor apparatuses 11, 13, 15, 17, and 19.

For example, the blockchain ledger 12 stores pieces of behavior information that are generated/detected by the monitor apparatuses 11, 13, 15, 17, and 19 every five minutes between 1:00 pm to 2:00 pm, and the rest monitor apparatus 13, 15, 17, and 19 store blockchain ledgers having the same contents as the blockchain ledger 12. When one or more pieces of previous behavior information are added by the monitor apparatus 11 into the blockchain ledger 12, the same piece(s) of previous behavior information will be added into the blockchain ledgers of the monitor apparatuses 13, 15, 17, and 19 as well. Please note that the way to synchronize the blockchain ledgers between the monitor apparatuses 11, 13, 15, 17, and 19 is a conventional technology in the field of blockchain technology, so it will not be further described herein.

Please note that each of the piece of behavior information and the pieces of previous behavior information may include one of or a combination of at least one piece of hardware performance information (e.g., CPU performance information, memory performance information, or hard drive performance information), a network utilization rate, at least one network packet feature value (e.g., the number of various protocols, source IP address, or destination IP address), and a number of system call of one of the electronic apparatuses (i.e., one of the monitor apparatuses 11, 13, 15, 17, and 19), but is not limited thereto.

In this embodiment, the blockchain node program executed by the processing unit 113 periodically monitors the monitor apparatus 11 and determines whether the monitor apparatus 11 is abnormal.

Specifically, the blockchain node program executed by the processing unit 113 periodically (e.g., every N seconds, where the variable N is a positive integer) executes the following operations: (a) obtaining a piece of behavior information of an electronic apparatus (i.e., the monitor apparatus 11) at a time point (e.g., the processing unit 113 may execute an agent monitor program, and the agent monitor program monitors the monitor apparatus 11 to obtain the piece of behavior information and then transmits the piece of behavior information to the blockchain node program), (b) retrieving, via the smart contract 10, a plurality of pieces of previous behavior information within a time interval from the blockchain ledger 12, wherein the time interval is defined by the time point, and each of the pieces of previous behavior information corresponds to one of a plurality of electronic apparatuses (i.e., the monitor apparatuses 11, 13, 15, 17 and 19), (c) determining a legality of the piece of behavior information according to the retrieved pieces of previous behavior information that are within the time interval, and (d) writing the piece of behavior information into the blockchain ledger 12. In some embodiments, when the legality of the piece of behavior information indicates that the piece of behavior information is an abnormal behavior information, the blockchain node program executed by the processing 113 generates an alerting signal to inform the administrator that the monitor apparatus 11 might be abnormal. Thereby, an alerting effect is provided.

Please note that the aforementioned determination mechanism is based on the idea that all IoT apparatuses (i.e., the monitor apparatuses 11, 13, 15, 17, and 19) in the IoT system 1 have, in principle, similar statuses within the same time interval. Based on this idea, the blockchain node program executed by the processing unit 113 decides a time interval according to the time point (e.g., a time interval covering this time point, or a time interval near this time point), and determines the legality of the piece of behavior information at this time point according to pieces of previous behavior information of all the IoT apparatuses within the time interval (e.g., according to similarity values).

For ease of understanding, a concrete example is given herein to show the operations periodically performed by the blockchain node program executed by the processing unit 113. Please refer to FIG. 1C and FIG. 1D, which depict information related to the time points T1 and T2 respectively.

Figure 1C:
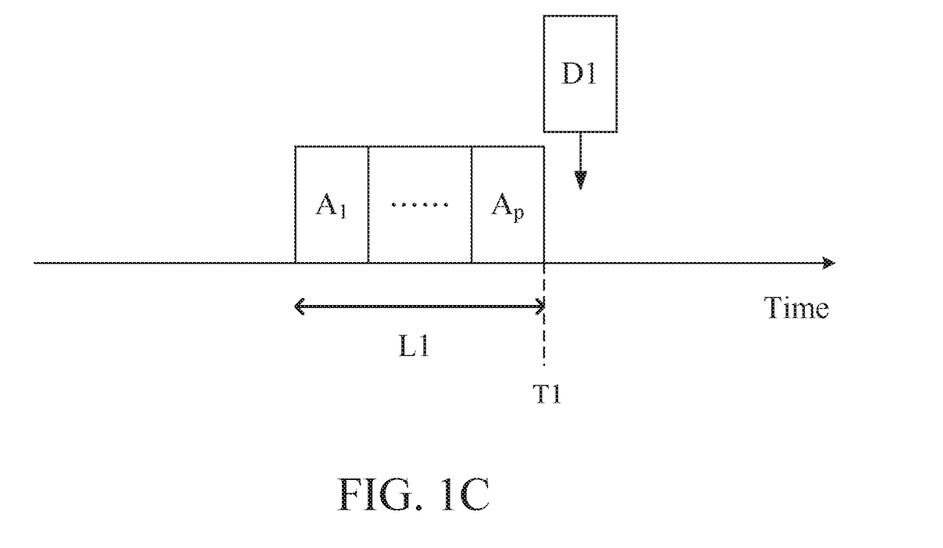
FIG. 1C depicts a time interval L1 corresponding to a time point T1 and a piece of previous behavior information within the time interval L1.

At the time point T1, a piece of behavior information D1 of the monitor apparatus 11 is detected by the blockchain node program executed by the processing unit 113. Then, the blockchain node program executed by the processing unit 113 decides a time interval L1 (e.g., from 2 minutes before the time point T1 to the time point T1) according to the time point T1 and retrieves, via the smart contract 10, a plurality of pieces of previous behavior information $A_1, \ldots, A_p$ within the time interval L1 from the blockchain ledger 12. Next, the blockchain node program executed by the processing unit 113 determines the legality of the piece of behavior information D1 of the monitor apparatus 11 at the time point T1 according to the pieces of previous behavior information $A_1, \ldots, A_p$. The blockchain node program executed by the processing unit 113 also writes the piece of behavior information D1 of the monitor apparatus 11 at the time point T1 into the blockchain ledger 12, and the piece of behavior information D1 of the monitor apparatus 11 at the time point T1 is synchronously written to other monitor apparatuses 13, 15, 17, and 19.

Now, how the blockchain node program executed by the processing unit 113 determines the legality of the piece of behavior information D1 of the monitor apparatus 11 at the time point T1 according to the pieces of previous behavior information $A_1, \ldots, A_p$ will be further described.

In some embodiments, the blockchain node program executed by the processing unit 113 compares every two of the pieces of previous behavior information $A_1, \ldots, A_p$ within the time interval L1 and the piece of behavior information D1 of the monitor apparatus 11 at the time point T1 to obtain a plurality of similarity values. Then, the blockchain node program executed by the processing unit 113 calculates an average and a standard deviation of the similarity values. Thereafter, the blockchain node program executed by the processing unit 113 determines the legality of the piece of behavior information D1 according to the average and the standard deviation. For example, among the similarity values calculated according to the piece of behavior information D1, if a percentage of the similarity values that fall outside M standard deviations exceeds a threshold, the piece of behavior information D1 is an abnormal behavior information. The variable M is a positive integer.

It is hereby assumed that there are 100 pieces of previous behavior information $A_1, \ldots, A_p$ within the time interval L1. Considering all the 100 pieces of previous behavior information $A_1, \ldots, A_p$ and the piece of behavior information D1 of the monitor apparatus 11 at the time point T1, there is 101 pieces of behavior information in total. The blockchain node program executed by the processing unit 113 calculates a similarity value between every two of the 101 pieces of behavior information to obtain $$C\binom{101}{2}$$

pieces of similarity values and then calculates an average and a standard deviation of the similarity values. For the 100 similarity values between the piece of behavior information D1 and the 100 pieces of previous behavior information $A_1, \ldots, A_p$, the blockchain node program executed by the processing unit 113 determines whether a percentage of similarity values that fall outside M (e.g., 3) standard deviations exceeds a threshold (e.g., 70%). If the determination result is that the percentage exceeds the threshold, the piece of behavior information is an abnormal behavior information.

In some embodiments, the blockchain node program executed by the processing unit 113 analyzes the previous behavior information $A_1, \ldots, A_p$ within the time interval L1 and the piece of behavior information D1 of the monitor apparatus 11 at the time point T1 according to an outlier analysis algorithm (e.g., the K-means algorithm) to generate a clustering result, and then determines the legality of the piece of behavior information D1 according to the clustering result. Specifically, if the clustering result indicates that the piece of behavior information D1 is an outlier, the piece of behavior information D1 is considered as an abnormal behavior information. If the clustering result indicates that the piece of behavior information D1 is not an outlier, the piece of behavior information D1 is a normal behavior information. Please note that a person of ordinary skill in the art shall understand how the outlier analysis algorithm is used for clustering, so it will not be further described herein.

Figure 1D:
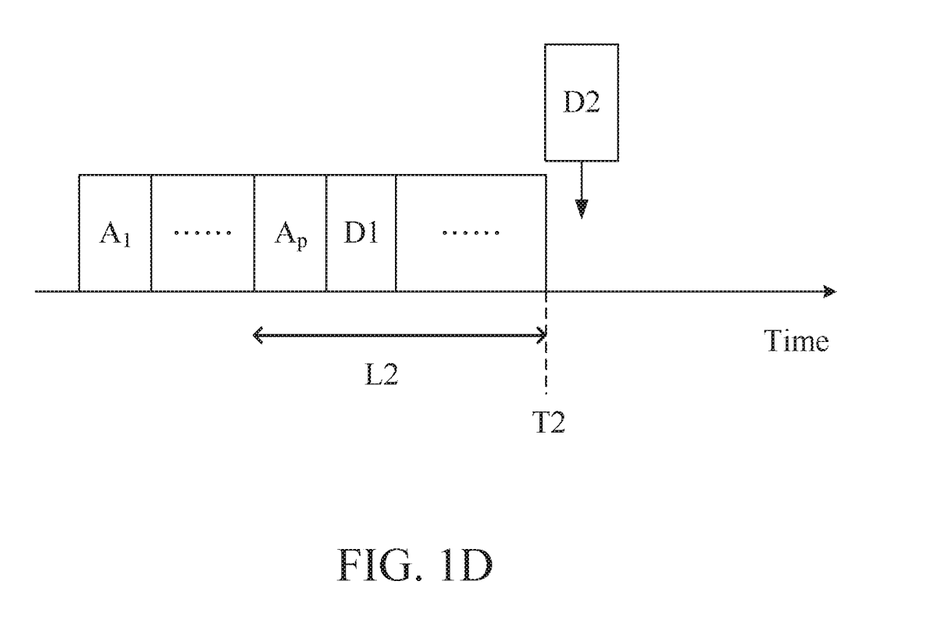
FIG. 1D depicts a time interval L2 corresponding to a time point T2 and a piece of previous behavior information within the time interval L2.

As mentioned, the blockchain node program executed by the processing unit 113 periodically executes the aforesaid operations (a) to (d). Accordingly, if the blockchain node program executed by the processing unit 113 detects a piece of behavior information D2 of the monitor apparatus 11 at a time point T2 that is N seconds after the time point T1, the aforesaid operations (a) to (d) will be repeated by the blockchain node program executed by the processing unit 113. Briefly speaking, the blockchain node program executed by the processing unit 113 decides a time interval L2 according to the time point T2, retrieves pieces of previous behavior information within the time interval L2 from the blockchain ledger 12, determines the legality of the piece of behavior information D2 according to the pieces of previous behavior information within the time interval L2, write the piece of behavior information D2 into the blockchain ledger 12, and writes the piece of behavior information D2 to other monitor apparatuses 13, 15, 17, and 19 synchronously. After the time point T2, the blockchain node program executed by the processing unit 113 continues to periodically perform the aforesaid operations (a) to (d), which will not be further described.

In some embodiments, the monitor apparatus 11 also determines whether an application to be activated is legal. In those embodiments, the smart contract 13 has a whitelist, which stores information of a plurality of legal applications. In those embodiments, the processing unit 113 also executes an agent monitor program (not shown). If the agent monitor program detects an activation request from an application, the agent monitor program retrieves the whitelist from the smart contract 10 and determines the legality of the application by comparing the application with the whitelist. If the application is not in the whitelist, the agent monitor program blocks the activation request of the application. Only when the application is in the whitelist will the agent monitor program allow the application be activated.

In some embodiments, the whitelist stores a hash value of each of the legal applications. In those embodiments, if the agent monitor program detects an activation request from an application, the agent monitor program calculates a hash value of the application, retrieves the whitelist from the smart contract 10, and determines the legality of the application by comparing the hash value of the application with the hash values of the legal applications. If the hash value of the application is not in the whitelist, the agent monitor program blocks the activation request of the application. Only when the hash value of the application is in the whitelist will the agent monitor program allow the application be activated.

From the above descriptions, the blockchain node program executed by the monitor apparatus 11 periodically obtains a piece of behavior information of the monitor apparatus 11, decides a time interval according to a time point of the piece of behavior information (e.g., a time interval covering the time point, or a time interval near the time point), and determines the legality of the piece of behavior information at the time point according to pieces of previous behavior information of all the monitor apparatuses 11, 13, 15, 17, and 19 within the time interval (e.g., according to similarity values). Because (a) all monitor apparatuses 11, 13, 15, 17, and 19 in the IoT system 1 have, in principle, similar behaviors within the same time interval and (b) the pieces of previous behavior information are stored in the blockchain ledger 12 that cannot be tampered easily, this embodiment can accurately determine whether the monitor apparatus 11 is abnormal. Further for an application that is going to be activated, the monitor apparatus 11 compares it with a whitelist. Because the whitelist is stored in the smart contract 10 that cannot be tampered easily, activation of an illegal application can be easily blocked. Therefore, the monitor apparatus 11 can effectively monitor applications that is/are going to be activated or that has/have been activated. The monitor apparatus 11 can not only prevent illegal applications from being activated but also timely inform the administrator/user that the monitor apparatus 11 is abnormal (for alerting purpose). Thereby, illegal operations on the electronic apparatus can be effectively blocked.

Figure 2A:
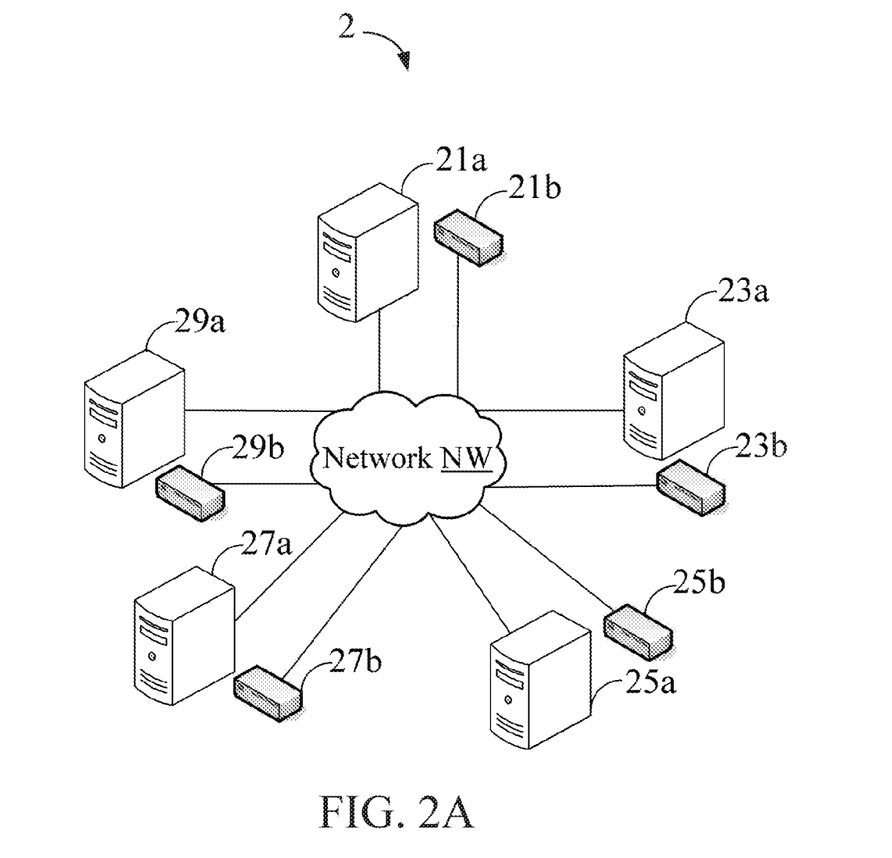
FIG. 2A depicts a schematic architectural view of an IoT system 2 according to a second embodiment.

A second embodiment of the present invention is an IoT system 2 and a schematic architectural view of which is depicted in FIG. 2A. The IoT system 2 comprises a plurality of monitor apparatus 21a, 23a, 25a, 27a, and 29a and a plurality of electronic apparatuses 21b, 23b, 25b, 27b, and 29b, wherein all of which connect with a network NW. The monitor apparatus 21a, 23a, 25a, 27a, and 29a cooperate with the electronic apparatuses 21b, 23b, 25b, 27b and 29b respectively. In this embodiment, each of the electronic apparatuses 21b, 23b, 25b, 27b and 29b can execute operations (e.g., sensing surrounding information) that can be executed by an IoT apparatus, so each of the electronic apparatuses 21b, 23b, 25b, 27b and 29b can be considered as an IoT apparatus in the IoT system 2. Additionally, each of the monitor apparatus 21a, 23a, 25a, 27a and 29a executes a blockchain node program to act as a blockchain node, and these blockchain nodes form a blockchain system. Please note that there is no restriction on the number of monitor apparatuses that can be comprised in the IoT system 2.

The IoT system 2 of the second embodiment can perform similar operations, have the same functions, and deliver the same effect as the IoT system 1 of the first embodiment. Therefore, only differences between the two embodiments will be detailed in the following description. In the second embodiment, the monitor apparatuses 21a, 23a, 25a, 27a, and 29a perform the same operations, and the electronic apparatuses 21b, 23b, 25b, 27b and 29b perform the same operations. For convenience, the monitor apparatus 21a and the electronic apparatus 21b will be taken as examples for describing of the differences between these two embodiments.

Figure 2B:
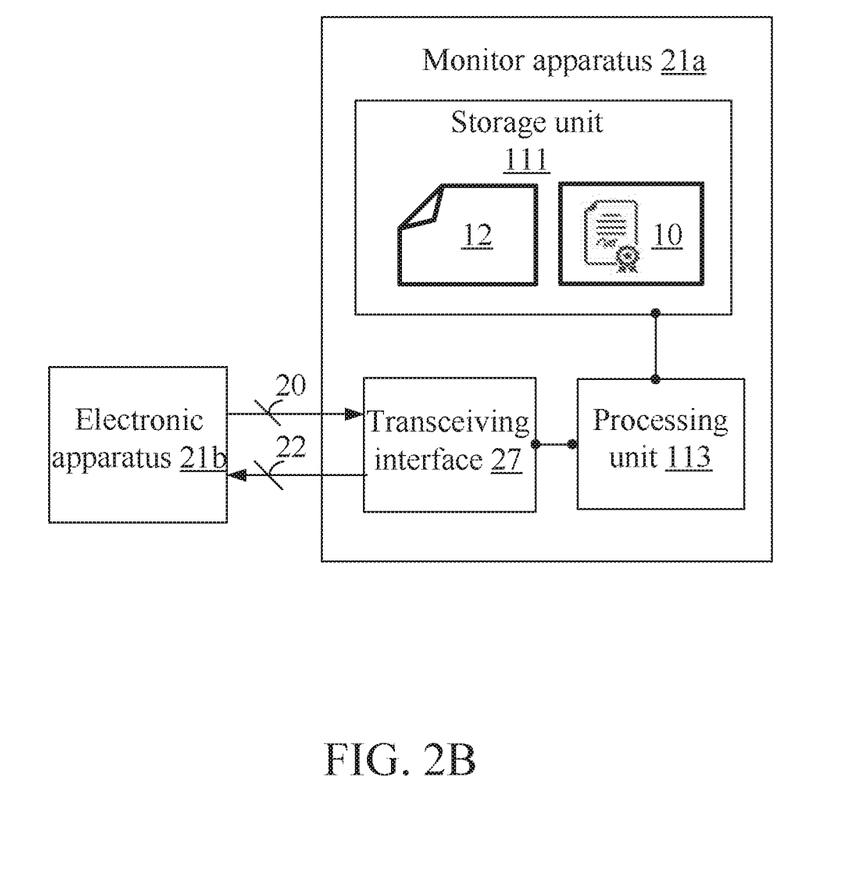
FIG. 2B depicts a schematic view of a monitor apparatus 21a and an electronic apparatus 21b according to the second embodiment.

Please refer to FIG. 2B, which depicts a schematic view of the monitor apparatus 21a and the electronic apparatus 21b of the second embodiment. In this embodiment, the monitor apparatus 21a further comprises a transceiving interface 27 in addition to the storage unit 111 and the processing unit 113. The transceiving interface 27 is electrically connected to the processing unit 113. In this embodiment, the electronic apparatus 21b executes the agent monitor program described in the first embodiment and performs all operations executed by the agent monitor program. Besides, in this embodiment, the processing unit 113 of the monitor apparatus 21a executes the blockchain program described in the first embodiment and performs all operations executed by the blockchain node program.

In this embodiment, the electronic apparatus 21b periodically monitors its own status, while the monitor apparatus 21a determines whether the electronic apparatus 21b is abnormal. Briefly speaking, the electronic apparatus 21b periodically obtains a piece of behavior information at a time point (e.g., periodically monitoring by the agent monitor program executed by the electronic apparatus 21b), and periodically transmits the piece of behavior information to the monitor apparatus 21a to determine whether the electronic apparatus 21b is abnormal. From the viewpoint of the monitor apparatus 21a, the transceiving interface 27 periodically receives a piece of behavior information at a certain time point from the electronic apparatus 21b, and the blockchain node program run by the processing unit 113 performs operations as described in the first embodiment to periodically determine the legality of the piece of behavior information transmitted from the electronic apparatus 21b. Based on the descriptions in the first embodiment, a person of ordinary skill in the art shall understand how the electronic apparatus 21b and the monitor apparatus 21a operate, so it will not be further described herein.

In some embodiments, when there is an application going to be activated in the electronic apparatus 21b, the electronic apparatus 21b determines the legality of the application according to the whitelist 22 provided by the monitor apparatus 21a. Briefly speaking, when the agent monitor program executed by the electronic apparatus 21b detects an activation request from an application, the agent monitor program transmits a whitelist request 20 to the monitor apparatus 21a. The transceiving interface 27 of the monitor apparatus 21a receives the whitelist request 20 from the electronic apparatus 21b, the blockchain node program of the processing unit 113 retrieves the whitelist 22 from the smart contract 20 in response to the whitelist request 20, and the transceiving interface 27 transmits the whitelist 22 to the electronic apparatus 21b. Once the electronic apparatus 21b receives the whitelist 22, the electronic apparatus 21b determines the legality of the application by comparing the application with the whitelist 22. How the electronic apparatus 21b and the monitor apparatus 21a determine the legality of an application that is going to be activated in the electronic apparatus 21b according to the whitelist 22 can be understood by those of ordinary skill in the art, so this will not be further described herein.

In addition to the aforesaid operations, the monitor apparatus 21a of the second embodiment can also execute all the operations that can be executed by the blockchain node program of the first embodiment, and the electronic apparatus 21b of the second embodiment can also execute all the operations that can be executed by the agent monitor program of the first embodiment. How the second embodiment executes these operations, have the same functions, and deliver the same technical effects as the first embodiment can be readily appreciated by those of ordinary skill in the art, so it will not be further described herein.

Figure 3A:
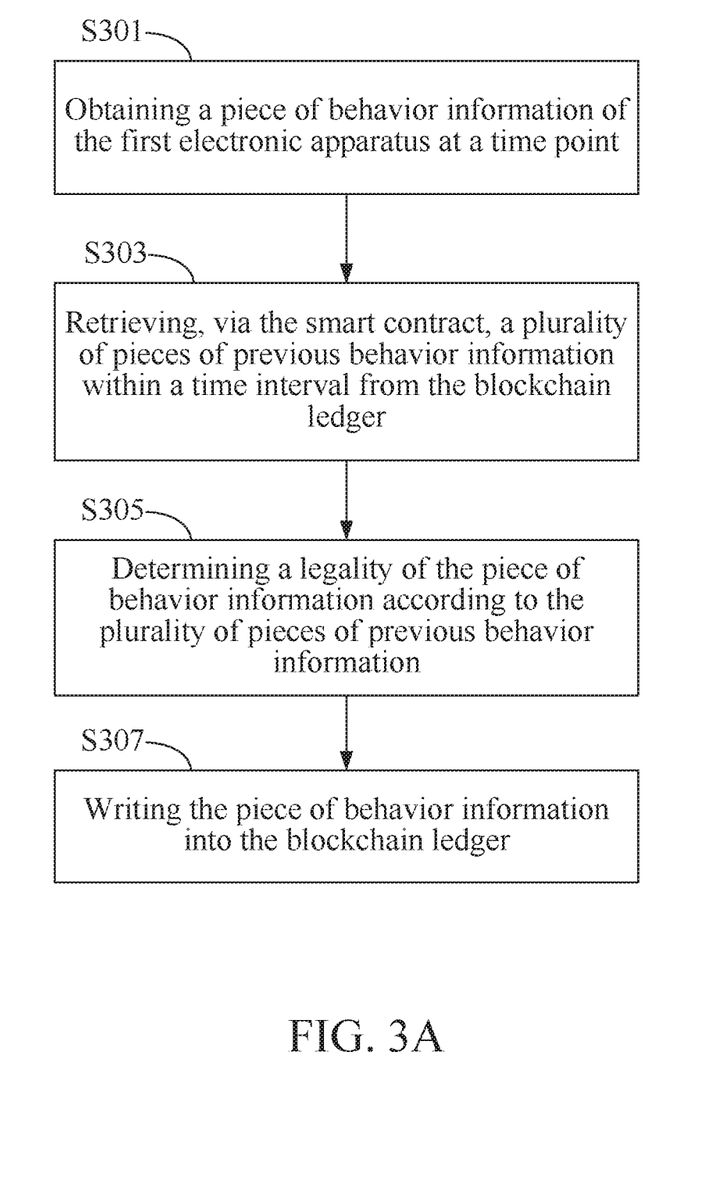
FIG. 3A depicts a partial flowchart diagram of a third embodiment.

A third embodiment of the present invention is a monitor method, and a portion of the flowchart of which is depicted in FIG. 3A. The monitor method is adapted for an electronic computing apparatus, e.g., the monitor apparatus 11 described in the first embodiment or the monitor apparatus 21a described in the second embodiment. The electronic computing apparatus stores a smart contract and a blockchain ledger of a blockchain system.

The monitor method periodically performs the procedure depicted in FIG. 3A to monitor whether a first electronic apparatus is in an abnormal status. First, step S301 is executed by the electronic computing apparatus for obtaining a piece of behavior information of the first electronic apparatus at a time point. Then, step S303 is executed by the electronic computing apparatus for retrieving, via the smart contract, a plurality of pieces of previous behavior information within a time interval from the blockchain ledger. The time interval is defined by the time point, and each of the pieces of previous behavior information corresponds to one of a plurality of second electronic apparatuses and the first electronic apparatus. For example, the second electronic apparatuses and the first electronic apparatus may be the monitor apparatuses 11, 13, 15, 17, and 19 described in the first embodiment, or the electronic apparatuses 21b, 23b, 25b, 27b, and 29b described in the second embodiment, but are not limited thereto. Afterwards, step S305 is executed by the electronic computing apparatus for determining a legality of the piece of behavior information according to the plurality of pieces of previous behavior information. In some embodiments, when the legality of the piece of behavior information indicates that the piece of behavior information is an abnormal behavior information, the monitor method further executes a step to generate an alerting signal (not shown). In step S307, the electronic computing apparatus writes the piece of behavior information into the blockchain ledger.

Please note that the piece of behavior information obtained in the step S301 may comprise one of or a combination of a piece of hardware performance information, a network utilization rate, a network packet feature value, and a number of system call of the first electronic apparatus, but is not limited thereto. Moreover, each of the pieces of previous behavior information retrieved in the step S305 may be one of or a combination of a piece of hardware performance information, a network utilization rate, a network packet feature value, and a number of system call of any of the second electronic apparatuses and the first electronic apparatus, but is not limited thereto.

In some embodiments, the step S305 may be accomplished by the following steps: (i) comparing, by the electronic computing apparatus, every two of the plurality of pieces of previous behavior information and the piece of behavior information to obtain a plurality of similarity values, (ii) calculating, by the electronic computing apparatus, an average and a standard deviation of the similarity values, and (iii) determining, by the electronic computing apparatus, the legality of the piece of behavior information according to the average and the standard deviation.

In some embodiments, the step S305 may be accomplished by the following steps: (i) analyzing, by the electronic computing apparatus, the piece of behavior information and the plurality of pieces of previous behavior information according to an outlier analysis algorithm to generate a clustering result and (ii) determining, by the electronic computing apparatus, the legality of the piece of behavior information according to the clustering result. If the clustering result is that the piece of behavior information is an outlier, the legality of the piece of behavior information indicates that the piece of behavior information is an abnormal behavior information.

Figure 3B:
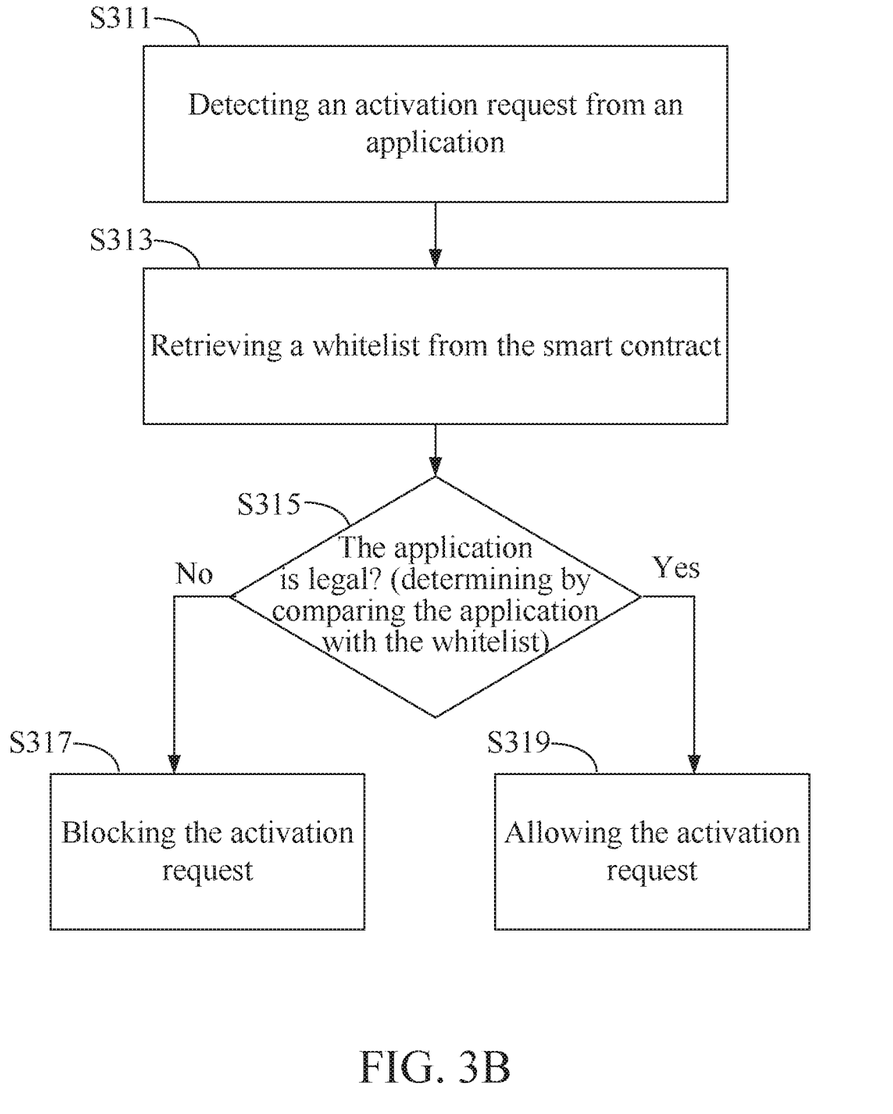
FIG. 3B depicts a partial flowchart diagram of the third embodiment.

In some embodiments, if the electronic computing apparatus that executes the monitor method is the first electronic computing apparatus (e.g., the monitor apparatus 1), the monitor method may further executes the procedure depicted in FIG. 3B to monitor the activation of an application. In step S311, the electronic computing apparatus detects an activation request of an application. Then, in step S313, the electronic computing apparatus retrieves a whitelist from the smart contract. Next in step S315, the electronic computing apparatus determines a legality of the application (i.e., whether the application is legal) by comparing the application with the whitelist. If the application is not in the whitelist, the application is illegal and the step S317 is then executed to block the activation request. If the application is in the whitelist, the application is legal and then the step S319 is executed to allow the activation request. In some embodiments, the whitelist stores a hash value of each of the plurality of legal applications. In those embodiments, the step S315 determines the legality of the application by comparing a hash value of the application with the hash values of the legal applications.

In some embodiments, if the electronic computing apparatus that executes the monitor method is not the first electronic computing apparatus (e.g., the electronic computing apparatus is the monitor apparatus 21a, while the first electronic apparatus is the electronic apparatus 21b), the monitor method may further comprise a step executed by the electronic computing apparatus for receiving a whitelist request from the first electronic apparatus, and another step executed by the electronic computing apparatus for transmitting a whitelist comprised in the smart contract to the first electronic apparatus in response to the whitelist request so that the first electronic apparatus determines a legality of an application by comparing the application with the whitelist.

In addition to the aforesaid operations, the third embodiment can also execute all the operations and steps described in the first and the second embodiments, have the same functions, and deliver the same technical effect as the first and the second embodiments. How the third embodiment executes these operations and steps, have the same functions, and deliver the same technical effects as the first and the second embodiments can be readily appreciated by those of ordinary skill in the art, so it will not be further described herein.

The monitor method described in the third embodiment may be implemented by a computer program comprising a plurality of codes. The computer program may be stored in a non-transitory computer readable storage medium. When the codes comprised in the computer program are loaded into an electronic computing apparatus, the monitor method described in the third embodiment will be executed. The non-transitory computer-readable medium may be a read only memory (ROM), a flash memory, a floppy disk, a hard disk, a Compact Disk (CD), a mobile disk, a magnetic tape, a database accessible to networks, or any other storage media known to those skilled in the art and having the same functionality.

According to the descriptions of the above embodiments, the monitoring technology (including the monitor apparatus, method, and non-transitory computer readable storage medium thereof) provided in the present invention periodically determines whether behavior of an electronic apparatus (e.g., the monitor apparatus 11 or the electronic apparatus 21b) is abnormal according to a piece of behavior information of the electronic apparatus. The monitoring technology provided in the present invention decides a time interval according to a time point of the piece of behavior information, and determines the legality of the operation behavior of the electronic apparatus according to a plurality of pieces of previous behavior information of all electronic apparatuses (e.g., the monitor apparatuses 11, 13, 15, 17, and 19, or the electronic apparatuses 21b, 23b, 25b, 27b, and 29b) in the same IoT system within the time interval. Because (a) all electronic apparatuses comprised in the function-oriented IoT system have, in principle, similar operation behaviors within the same time interval and (b) the pieces of previous behavior information are stored in the blockchain ledger that cannot be tampered easily, the monitoring technology of the present invention can accurately determine whether the electronic apparatus is abnormal through the aforesaid operations. When there is an abnormal behavior, an alert message can be provided to the user to stop the illegal operations on the electronic apparatus as soon as possible. Because all the electronic apparatuses in the IoT system adopt the same monitoring technology and maintain the same blockchain ledger together, regional joint-protection effect can be achieved. Moreover, for an application that is going to be activated, the monitoring technology provided in the present invention compares it with a whitelist. Because the whitelist is stored in the smart contract that cannot be tampered easily, activation of an illegal application can be easily blocked.

According to the above descriptions, the monitor technology provided in the present invention can effectively monitor applications that is/are going to be activated and has/have been activated. The present invention can not only prevent illegal applications from being activated but also timely inform the administrator/user that the electronic apparatus is abnormal (for alerting purpose). Thus, illegal operations on the electronic apparatus can be effectively blocked.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A monitor method, being adapted for an electronic computing apparatus, the electronic computing apparatus storing a smart contract and a blockchain ledger of a blockchain system, the monitor method comprising:
   monitoring a first electronic apparatus periodically, comprising:
   (a) obtaining a piece of behavior information of the first electronic apparatus at a time point;
   (b) retrieving, via the smart contract, a plurality of pieces of previous behavior information within a time interval from the blockchain ledger, wherein the time interval is defined by the time point, and each of the pieces of previous behavior information corresponds to one of a plurality of second electronic apparatuses and the first electronic apparatus;
   (c) determining a legality of the piece of behavior information according to the plurality of pieces of previous behavior information; and
   (d) writing the piece of behavior information into the blockchain ledger;

wherein the step (c) further comprises:
comparing every two of the pieces of previous behavior information and the piece of behavior information to obtain a plurality of similarity values;
calculating an average and a standard deviation of the similarity values; and
determining the legality of the piece of behavior information according to the average and the standard deviation.

2. The monitor method of claim 1, wherein the step of monitoring the first electronic apparatus periodically further comprises:
generating an alerting signal when the legality of the piece of behavior information indicates that the piece of behavior information is an abnormal behavior information.

3. The monitor method of claim 1, wherein the piece of behavior information comprises one of or a combination of a piece of hardware performance information, a network utilization rate, a network packet feature value, and a number of system call of the first electronic apparatus.

4. The monitor method of claim 1, further comprising:
detecting an activation request from an application;
retrieving a whitelist from the smart contract; and
determining a legality of the application by comparing the application with the whitelist.

5. The monitor method of claim 4, further comprising:
blocking the activation request when the application is not in the whitelist.

6. The monitor method of claim 4, wherein the whitelist stores a hash value of each of a plurality of legal applications, and the monitor method determines the legality of the application by comparing a hash value of the application with the hash values of the plurality of legal applications.

7. The monitor method of claim 1, further comprising:
receiving a whitelist request from the first electronic apparatus; and
transmitting a whitelist comprised in the smart contract to the first electronic apparatus in response to the whitelist request so that the first electronic apparatus determines a legality of an application by comparing the application with the whitelist.

8. A monitor apparatus, comprising:
a storage unit, being configured to store a blockchain ledger and a smart contract of a blockchain system; and
a processing unit electrically connected to the storage unit, being configured to execute a blockchain node program, the blockchain node program performing the following operations periodically:
(a) obtaining a piece of behavior information of a first electronic apparatus at a time point;
(b) retrieving, via the smart contract, a plurality of pieces of previous behavior information within a time interval from the blockchain ledger, wherein the time interval is defined by the time point, and each of the pieces of previous behavior information corresponds to one of a plurality of second electronic apparatuses and the first electronic apparatus;
(c) determining a legality of the piece of behavior information according to the pieces of previous behavior information; and
(d) writing the piece of behavior information into the blockchain ledger;
wherein the operation (c) periodically performed by the blockchain node program comprises the following operations: comparing every two of the plurality of pieces of previous behavior information and the piece of behavior information to obtain a plurality of similarity values; calculating an average and a standard deviation of the similarity values; and determining the legality of the behavior information according to the average and the standard deviation.

9. The monitor apparatus of claim 8, wherein the processing unit further generates an alerting signal when the legality of the piece of behavior information indicates that the behavior information is an abnormal behavior information.

10. The monitor apparatus of claim 8, wherein the piece of behavior information comprises one of or a combination of a piece of hardware performance information, a network utilization rate, a network packet feature value, and a number of system call of the first electronic apparatus.

11. The monitor apparatus of claim 8, wherein the processing unit further executes an agent monitor program, and the agent monitor program detects an activation request from an application, retrieves a whitelist from the smart contract, and determines a legality of the application by comparing the application with the whitelist.

12. The monitor apparatus of claim 11, wherein the activation request is blocked by the agent monitor program when the application is not in the whitelist.

13. The monitor apparatus of claim 11, wherein the whitelist stores a hash value of each of a plurality of legal applications, and the agent monitor program determines the legality of the application by comparing a hash value of the application with the hash values of the plurality of legal applications.

14. The monitor apparatus of claim 8, further comprising:
a transceiving interface electrically connected to the processing unit, being configured to receive a whitelist request from the first electronic apparatus, and transmit a whitelist comprised in the smart contract to the first electronic apparatus in response to the whitelist request so that the first electronic apparatus determines a legality of an application by comparing the application with the whitelist.

15. A non-transitory computer readable storage medium, having a computer program stored therein, the computer program comprising a plurality of codes, the computer program executing a monitor method after being loaded into an electronic computing apparatus, the electronic computing apparatus storing a smart contract and a blockchain ledger of a blockchain system, the monitor method comprising:
monitoring a first electronic apparatus periodically, comprising:
(a) obtaining a piece of behavior information of the first electronic apparatus at a time point;
(b) retrieving, via the smart contract, a plurality of pieces of previous behavior information within a time interval from the blockchain ledger, wherein the time interval is defined by the time point, and each of the plurality of pieces of previous behavior information corresponds to one of a plurality of second electronic apparatuses and the first electronic apparatus;
(c) determining a legality of the piece of behavior information according to the plurality of pieces of previous behavior information; and
(d) writing the piece of behavior information into the blockchain ledger;

wherein the step (c) further comprises:
- comparing every two of the pieces of previous behavior information and the piece of behavior information to obtain a plurality of similarity values;
- calculating an average and a standard deviation of the similarity values; and
- determining the legality of the piece of behavior information according to the average and the standard deviation.

* * * * *